(12) United States Patent
Nagano

(10) Patent No.: US 12,455,415 B2
(45) Date of Patent: Oct. 28, 2025

(54) SIGNAL LIGHT TRANSMISSION MEMBER

(71) Applicant: Tamron Co., Ltd., Saitama (JP)

(72) Inventor: Hideki Nagano, Saitama (JP)

(73) Assignee: TAMRON CO., LTD., Saitama (JP)

( * ) Notice: Subject to any disclaimer, the term of this patent is extended or adjusted under 35 U.S.C. 154(b) by 286 days.

(21) Appl. No.: 18/367,776

(22) Filed: Sep. 13, 2023

(65) Prior Publication Data

US 2024/0126020 A1 Apr. 18, 2024

(30) Foreign Application Priority Data

Oct. 18, 2022 (JP) .................................. 2022-167183

(51) Int. Cl.
*G02B 1/118* (2015.01)
*G02B 6/32* (2006.01)

(52) U.S. Cl.
CPC .............. *G02B 6/325* (2013.01); *G02B 1/118* (2013.01); *G02B 6/322* (2013.01)

(58) Field of Classification Search
CPC .......... G02B 1/118; G02B 6/322; G02B 6/325
See application file for complete search history.

(56) References Cited

U.S. PATENT DOCUMENTS

| | | | | |
|---|---|---|---|---|
| 4,632,505 A | * | 12/1986 | Allsworth | G02B 6/32 385/74 |
| 4,732,450 A | * | 3/1988 | Lee | G02B 6/4296 385/39 |
| 5,355,084 A | * | 10/1994 | Okajima | G01R 33/0322 29/595 |
| 5,394,493 A | * | 2/1995 | Ames | G02B 6/262 385/35 |
| 5,971,627 A | * | 10/1999 | Nedstedt | G02B 6/32 385/61 |
| 7,121,735 B2 | * | 10/2006 | Jitsuno | G02B 6/32 385/33 |
| 7,218,811 B2 | * | 5/2007 | Shigenaga | G02B 6/32 385/39 |
| 7,474,822 B2 | * | 1/2009 | Kobayashi | G02B 6/325 385/35 |
| 9,588,302 B2 | * | 3/2017 | Grinderslev | G02B 6/32 |
| 9,599,771 B2 | * | 3/2017 | Nielson | G02B 6/3882 |
| 10,598,850 B2 | * | 3/2020 | Ohara | G02B 6/0008 |
| 2007/0211999 A1 | * | 9/2007 | Kobayashi | G02B 6/3878 385/35 |
| 2014/0376860 A1 | * | 12/2014 | Mitsui | G02B 6/4206 385/33 |

FOREIGN PATENT DOCUMENTS

| | | | | |
|---|---|---|---|---|
| GB | 2408350 A | * | 5/2005 | ............... G02B 6/32 |
| JP | 2003255184 A | * | 9/2003 | |
| JP | 2004046105 A | * | 2/2004 | |
| JP | 2004233593 A | * | 8/2004 | |
| JP | 2007225796 A | * | 9/2007 | |

\* cited by examiner

*Primary Examiner* — Ryan A Lepisto
(74) *Attorney, Agent, or Firm* — Paratus Law Group, PLLC

(57) ABSTRACT

A signal light transmission member includes an AR coated lens, a light transmission part, and an optical fiber. The refractive index of the light transmission part has a specific relationship with the refractive index of a core material of the optical fiber. An anti-reflective coating is formed at an interface portion between the lens of the AR coated lens and the light transmission part.

9 Claims, 6 Drawing Sheets

SIGNAL LIGHT TRANSMISSION MEMBER

CROSS-REFERENCE TO RELATED APPLICATIONS

This application is based on and claims the benefit of priority from Japanese Patent Application No. 2022-167183, filed on Oct. 18, 2022, the entire contents of which are incorporated herein by reference.

BACKGROUND OF THE INVENTION

Technical Field

The present invention relates to a signal light transmission member.

Related Art

In the optical communication technology, a signal light transmission member for connecting optical fibers and transmitting signal light output from one optical fiber to the other optical fiber is essential for construction of an optical communication network and setup of an optical signal input/output device. In such transmission of signal light, signal transmission of the optical fibers is performed by physical contacting the tip portions of optical fibers using an adapter as a common practice. However, this practice has a disadvantage that transmission efficiency of an optical signal is extremely lowered if the tip portions of centers of the optical fibers become misaligned even in the order of microns. In addition, it is widely known that the signal quality is significantly deteriorated due to dust or the like. As one of techniques for compensating for the disadvantage, an expanded beam connector using a lens is known.

Meanwhile, in optical communication applications, reflected return light generated by a local refractive index difference may cause malfunction or noise generation of a light emitting element, and may cause attenuation of communication signal intensity or deterioration of signal quality. Therefore, it is desirable to provide an anti-reflective coating for reducing reflected light on the surface of a lens used for optical communication. However, the expanded beam connector is difficult to apply complete antireflection treatment, and tends to have a disadvantage that a non-negligible level of reflection attenuation, that is, a return loss occurs in connection of optical signals.

As one of methods for compensating for this disadvantage, for example, there has been proposed a lens-attached optical connector including a tubular optical fiber connection sleeve constituting an optical connector housing, a main body made of a polyurethane-based or polyester-based elastomer and formed in a light-transmitting cylindrical shape, and a light guide member made of a spherical light guide lens housed in the main body (refer to JP 2003-255184 A, for example).

As described above, in the optical communication technology, it is required to suppress a loss of signal light. In the connector described in JP 2003-255184 A, a loss of signal light may occur when signal light is transmitted in the connector. As such, the conventional technique still has room for consideration from the viewpoint of suppressing a loss of signal light in the connector.

An aspect of the present invention is to achieve a signal light transmission member capable of suppressing a loss of optical communication signal light.

SUMMARY OF THE INVENTION

In order to solve the above problem, a signal light transmission member according to an aspect of the present invention includes:

a lens that has a refractive index n1 and that collimates signal light;

a housing part that houses the lens;

a light transmission part that has light permeability, has a refractive index n2 smaller than n1, is made of a light transmission material filling the housing part, and has the lens embedded therein;

an optical fiber through which the signal light passes, the optical fiber being inserted into the housing part and having an end portion fixed by the light transmission part at a position facing the lens on an optical axis of the lens in the housing part; and an anti-reflective coating that is formed at least at a portion of the optical path of the signal light at the interface between the lens and the light transmission part, wherein if the refractive index of a core material of the optical fiber is designated as n4, a following equation (1) is satisfied:

$$n4-0.14 \leq n2 \leq n4+0.14 \tag{1}.$$

According to an aspect of the present invention, it is possible to achieve a signal light transmission member capable of suppressing a loss of signal light of optical communication.

DESCRIPTION OF THE EMBODIMENTS

Hereinafter, embodiments of the present invention will be described.

First Embodiment

[Overview of Configuration]

Figure 1:
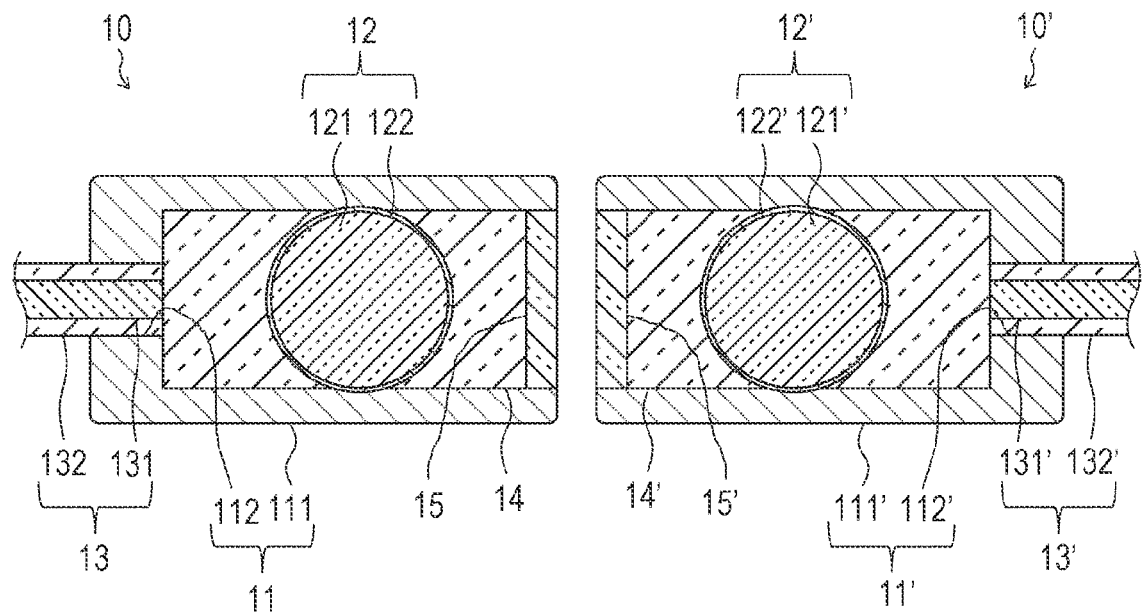
FIG. 1 is a diagram schematically illustrating a configuration of a signal light transmission member according to a first embodiment of the present invention.

FIG. 1 is a diagram schematically illustrating a configuration of a signal light transmission member according to a first embodiment of the present invention. As illustrated in FIG. 1, a signal light transmission member 10 includes a housing part 11, an antireflection (AR) coated lens 12, an optical fiber 13, and a light transmission part 14.

The signal light transmission member 10 and a signal light transmission member 10' are configured to be connectable in a state where their respective cover glasses 15 and 15' face each other.

When the signal light transmission member 10 and the signal light transmission member 10' are connected to each other, optical fibers 13 and 13' are connected to each other so as to be able to transmit signal light. As described above, the signal light transmission member 10 and the signal light transmission member 10' are optical communication connectors for connecting the optical fibers 13 and 13', respectively. Hereinafter, the configuration of the signal light transmission member 10 will be described in more detail.

[Housing Part]

The housing part 11 houses the AR coated lens 12. The housing part 11 includes a main body portion 111 having an opening shape, a hole 112 formed in the main body portion 111, and a cover glass 15 that closes an opening end of the main body portion 111. The hole 112 includes grooves 111B and 111C to be described later, and the optical fiber 13 is inserted into the hole 112. The cover glass 15 may have a coating for preventing reflection on each main surface. The coating may have the same composition or different compositions. As described above, the housing part 11 includes the main body portion 111 having one end opened and the transparent window (cover glass 15) closing the one end. The optical fiber 13 is arranged in the housing part 11 along the normal direction of the surface of the cover glass 15. As described above, the end of the connection portion for optical communication in the optical fiber 13 is inserted into the main body portion 111 from the other end toward the opening of the main body portion 111.

[Lens]

The AR coated lens 12 collimates signal light. The AR coated lens 12 includes a lens 121 that collimates signal light and an anti-reflective coating (AR coating) 122. The lens 121 has a refractive index n1.

The material of the lens 121 can be appropriately selected from a range of materials that can collimate signal light. The material of the lens 121 is preferably required to have optical homogeneity and high light transmittivity at a wavelength of light used for optical communication as characteristics. Examples of the material of the lens 121 include a glass material, a semiconductor, and a resin.

Examples of glass material for the lens 121 include silicate glass, borosilicate glass, phosphate glass, zinc selenide (ZnSe), calcium fluoride ($CaF_2$), and sapphire ($Al_2O_3$) glass. Examples of the semiconductor for the lens 121 include silicon (Si) and germanium (Ge). Examples of the resin for the lens 121 include a methacrylic resin, polycarbonate, polyvinylidene chloride, a modified silicone resin, a polyarylate (PAR) resin, an amorphous polyester resin, an amorphous fluororesin, a cycloolefin resin, an alicyclic polyolefin resin, a cyclic polyolefin resin, and an alicyclic acrylic resin.

The form of the lens 121 may be any form as long as it satisfies a condition of a refractive index described later and can collimate signal light. Examples of the lens 121 include ball lens, semi-ball lens, and aspherical lens. The lens 121 is preferably a ball lens from the viewpoint of making it possible to collimate the light emitted from the optical fiber at a short distance in the optical axis direction.

The lens 121 may be a commercially available glass material lens or a resin lens, or may be a processed product obtained by further processing a commercially available lens. Examples of the processing method of the lens 121 include polishing and a glass molding method in the case of a glass material lens. Examples of the processing method of the lens 121 include a processing method by polishing and etching in the case of a lens of a semiconductor material such as a silicon lens. Examples of the processing method of the lens 121 include molding methods such as injection molding, extrusion molding, compression molding, and cast molding, and processing methods such as cutting and polishing in the case of a resin lens.

<Anti-Reflective Coating>

The lens 121 has an anti-reflective coating 122 at an interface thereof. The anti-reflective coating 122 is formed at least at an interface portion through which signal light passes, at the interface of the lens 121 from the viewpoint of reducing a loss of signal light.

The reflection of signal light at the interface between optical elements inside the signal light transmission member 10 may cause a loss of signal light, malfunction of the light emitting element, and noise generation, which may result in deterioration of signal quality. From the viewpoint of suppressing such deterioration of signal quality, the AR coated lens 12 includes the anti-reflective coating 122 formed at least at the portion of the optical path of signal light at the interface between the lens 121 and the light transmission part 14. As above, the AR coated lens 12 is interposed at the interface between the lens 121 and the light transmission part 14. In the present embodiment, the AR coated lens 12 includes the anti-reflective coating 122 on the whole surface of the interface between the lens 121 and the light transmission part 14.

The anti-reflective coating 122 is required to have light transmittivity and low diffusivity of signal light. The anti-reflective coating 122 may be a single-layer coating or a multilayer coating as far as it has such desired characteristics. The anti-reflective coating 122 is not limited to either a single-layer coating or a multilayer coating in the case of an anti-reflective coating specialized only for a specific wavelength.

The anti-reflective coating that is a single-layer coating can be formed of at least inorganic fine particles. More specifically, the anti-reflective coating 122 of a single layer can be formed of a material that exhibits the desired characteristics described above, and can include inorganic oxide fine particles and a binder component curing agent that binds the inorganic oxide fine particles, for example. Examples of the inorganic oxide fine particles include silica particles, antimony particles, titania particles, alumina particles, niobium oxide particles, tin oxide particles, mixed particles thereof, and composite particles thereof. Examples of the binder component curing agent include an epoxy-based curing agent, an acryl-based curing agent, a urethane-based curing agent, an en-thiol-based curing agent, a cyanoacrylate-based curing agent, a silicone-based curing agent, a curing agent, a silane coupling agent, and a curing agent.

The anti-reflective coating that is a single-layer coating made of the inorganic fine particles includes voids between the particles. The voids can be impregnated with a light transmission material described later. Therefore, the anti-reflective coating can include the particles, the binder component curing agent that binds the particles, and the light transmission material that fills the voids formed by the particles.

On the other hand, in the case of an anti-reflective coating corresponding to a plurality of communication standards (for example, signal light with a wavelength of 1310 nm and signal light with a wavelength of 1500 nm), the anti-reflective coating 122 is preferably a multi-layer coating of layers that has light transmittivity and low diffusibility with respect to signal light with a plurality of wavelengths.

[Method for Producing Anti-Reflective Coating]

The anti-reflective coating 122 can be produced on the surface of the lens 121 using a known technique. A desirable method for producing the anti-reflective coating 122 on the surface of the lens 121 is coating. The coating method may be either a dry coating method or a wet coating method as long as the advantageous effect of the present invention can be obtained.

In the present embodiment, it is also effective to apply an antireflection structure to the surface shape of the antireflection lens 121 such as Moth-eye processing, instead of the anti-reflective coating 122.

<Dry Coating Method>

Examples of the dry coating method include vacuum deposition, sputtering, ion plating, and ion beam deposition, which are classified as physical vapor deposition, or atomic layer deposition and plasma CVD, which are classified as chemical vapor deposition.

As the inorganic material used in the dry coating method, a transparent inorganic material with a refractive index of 1.35 or more and 2.5 or less is preferably used. Examples of such a transparent inorganic material include $Al_2O_3$, $ZrO_2$+$Al_2O_3$, SiN, SiC, SiO, MgO, $La_2O_3$+$Al_2O_3$, $Y_2O_3$, $In_2O_3$+$SnO_2$, $La_2Ti_2O_7$, $SnO_2$, $Ta_2O_5$, $HfO_2$, $ZrO_2$, $CeO_2$, $WO_3$, $ZrO_2$+$TiO_2$, $Ta_2O_5$, $Ta_2O_5$+$ZrO_2$, $Ta_2O_5$+$TiO_2$, $Ti_3O_5$, $Ti_4O_7$, $TiPr_6O_{11}$+$TiO_2$, TiO, $TiO_2$, $Nb_2O_5$, $TiO_2$+$La_2O_3$, $Pr_6O_{11}$+$TiO_2$, $SiO_2$, $SiO_xN_y$, $CeO_2$, $MgF_2$, ZnS, and $YF_3$.

<Wet Coating Method>

Examples of the wet coating method include spin coating, dip coating, spray coating, layer-by-layer method (alternate lamination), and inkjet method.

The material coated by the wet coating method is preferably inorganic oxide fine particles with a particle diameter of 100 nm or less, resin fine particles with a particle diameter of 100 nm or less, or mixed particles thereof.

Examples of the material of the inorganic oxide fine particles include silica, antimony, titania, alumina, niobium oxide, tin oxide, and composite materials thereof.

Examples of the material of the resin fine particles include polystyrene, polymethacrylate (methacrylic resin), polyamine, polyimide, polycarbonate, polyethylene, and the like. One example of the material includes Micromer (product name) manufactured by Micromod Partikeltechnologie GmbH. The resin fine particles are monodisperse fine particles formed of polymethacrylate with a particle diameter of 25 nm.

It is realistic that the anti-reflective coating formed by a wet coating method is a single-layer coat or a multi-layer coat with an inorganic layer formed by a dry coating method. However, even if a multi-layer coating is formed at a lens interface by a wet coating method, the gist of the present invention is not hindered.

The single-layer coat formed by a wet coating method is a layer formed by binding the inorganic oxide fine particles with a binder component curing agent, for example. As an example in the present embodiment, fine particles with a refractive index of 1.32 to 2.55 are formed as a main component on a lens as a constituent component of a single-layer coat, and a binder component curing agent before curing sandwiched between the particles is polymerized. In this way, it is possible to adjust the refractive index of the single-layer coat with the fine particles to a refractive index n3 that is an intermediate refractive index between a refractive index n2 of the light transmission part 14 and a refractive index n1 of the lens 121.

The binder component curing agent preferably has good binding properties to the lens material and the fine particles constituting a single-layer coat, and does not substantially absorb light with a wavelength used for optical communication. Specifically, examples of the binder component curing agent include an epoxy-based curing agent, an acryl-based curing agent, a urethane-based curing agent, an ene-thiol-based curing agent, a cyanoacrylate-based curing agent, and a silicone-based curing agent, which have good binding properties to fine particles. As the binder component curing agent, a silane coupling agent and a silane compound such as tetraethoxysilane (TEOS) are also effective.

[Optical Fiber]

Signal light passes through the optical fiber 13. The optical fiber 13 is inserted into the housing part 11 and is fixed on the optical axis of the AR coated lens 12 in the housing part 11 by the light transmission part 14. For example, the optical fiber 13 is fixed by the light transmission part 14 such that the end thereof is positioned to face the AR coated lens 12 on the optical axis.

The optical fiber 13 includes a core material 131 and a clad material 132 covering an outer peripheral surface of the core material 131. The optical fiber 13 is configured such that signal light passes through the inside of the core material 131. The optical fiber 13 may be provided in a single mode or a multi-mode.

[Light Transmission Part]

The light transmission part 14 has light transmissivity and has the refractive index n2 smaller than n1 described above. The light transmission part 14 fills the housing part 11 to embed the AR coated lens 12.

The light transmission part 14 may be made of a light transmission material. The light transmission material may be a material that can embed the AR coated lens 12 in the housing part 11, that is, a material that can fix the AR coated lens 12 in the housing part 11, and may be a resin, for example. The resin is preferably a cured resin from the viewpoint of being able to fix the positions of the AR coated lens 12 and the optical fiber 13. The cured resin is a resin that is cured by polymerizing a curable resin material. Examples of the cured resin include a resin obtained by photopolymerization, a resin obtained by thermal curing, a resin obtained by two-liquid curing, and a resin obtained by curing at room temperature. Examples of the type of resin include an epoxy resin, a polyurethane resin, a polyester resin, a polyacrylic resin, a polyalkyl resin, a silicone resin, a phenol resin, and a melamine resin.

The light transmission part 14 may further contain a component other than the resin from the viewpoint of improving the characteristics. For example, from the viewpoint of improving various characteristics of the resin, the light transmission part 14 may be made of an organic-inorganic hybrid composite material that contains inorganic particles with a size equal to or less than a wavelength of signal light. The light transmission part 14 may further have more preferable characteristics. For example, the light transmission part 14 preferably has a linear thermal expansion coefficient close to the linear thermal expansion coefficient of the lens 121 from the viewpoint of long-term stability.

[Method for Manufacturing Signal Light Transmission Member]

The signal light transmission member 10 can be manufactured by a manufacturing method as illustrated in FIGS. 2 to 5.

As an example, the main body portion 111 of the housing part 11 that houses the lens includes a plurality of parts. The main body portion 111 is made of aluminum plates, for example, and as an example, the main body portion 111 is made of a bottom plate 1111, middle plates 1112 to 1114, upper plates 1115 to 1117 and 1115' to 1117', and covers 111E and 111F. The AR coated lens 12 is placed on the main body portion 111. The lens 121 of the AR coated lens 12 is a ball lens, and the AR coated lens 12 has the anti-reflective coating 122 on the whole surface of the lens 121.

Figure 2:
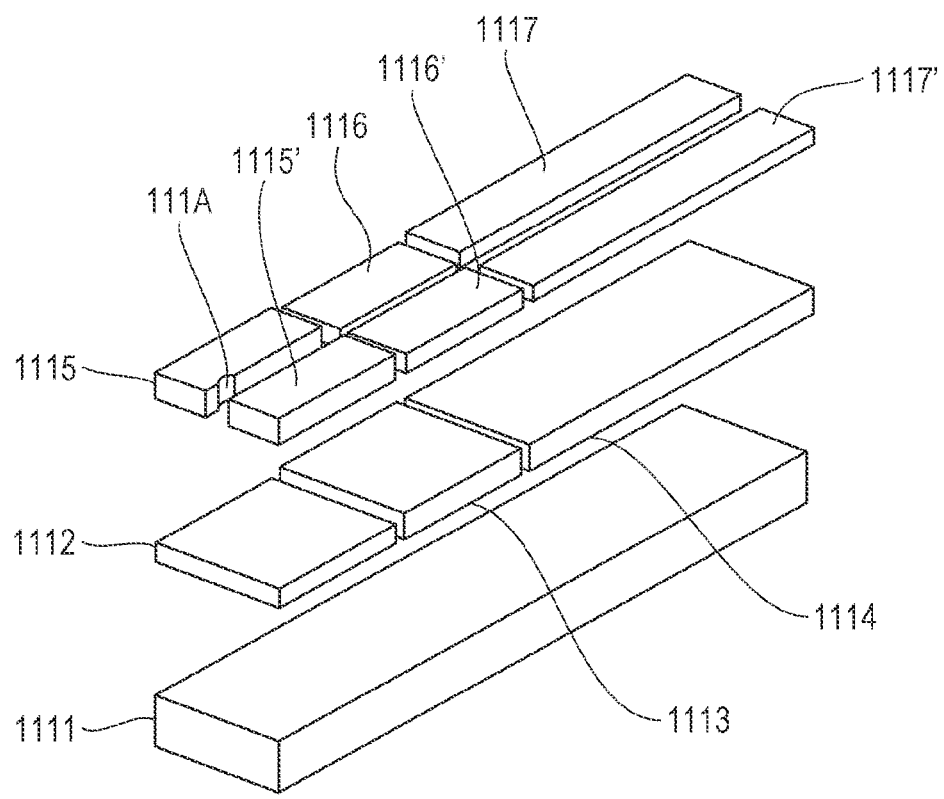
FIG. 2 is a diagram schematically illustrating a first state in a method for manufacturing the signal light transmission member according to the first embodiment of the present invention.

As illustrated in FIG. 2, the middle plates 1112 to 1114 are arranged on the bottom plate 1111. The middle plates 1112 to 1114 are arranged in order from one end side along the longitudinal direction of the bottom plate 1111 and have their respective appropriate thicknesses. The middle plate 1113 is arranged with a gap from the middle plate 1112 in the longitudinal direction of the bottom plate 1111.

The upper plates 1115 and 1115' are arranged on the middle plate 1112, the upper plates 1116 and 1116' are arranged on the middle plate 1113, and the upper plates 1117 and 1117' are arranged on the middle plate 1114.

Each of the upper plates 1115 and 1115' has a lens holding part 111A on one side. The lens holding parts 111A is a groove with an arcuate cross section extending along the thickness direction of the upper plate. The arc is an arc with the same diameter as the diameter of the AR coated lens 12. In the upper plates 1115 and 1115', the lens holding parts 111A face each other, and are arranged side by side with a gap left at the central portion in the lateral direction of the bottom plate 1111. The size of the gap has a distance at which the AR coated lens 12 is held by the opposing lens holding parts 111A, and is a distance at which the distance between the deepest portions of the opposing lens holding parts 111A is the same as the diameter of the AR coated lens 12, for example.

The upper plates 1116 and 1116' are rectangular plates in plan view, and are arranged side by side with a gap left at the central portion in the lateral direction of the bottom plate 1111. The size of the gap has a distance at which a core wire of the optical fiber 13 described later can be stored. Similarly to the upper plates 1116 and 1116', the upper plates 1117 and 1117' are rectangular plates in plan view, and are arranged side by side with a gap at the central portion in the lateral direction of the bottom plate 1111. The size of the gap has a distance at which a protective sleeve of the optical fiber 13 described later can be stored.

Figure 3:
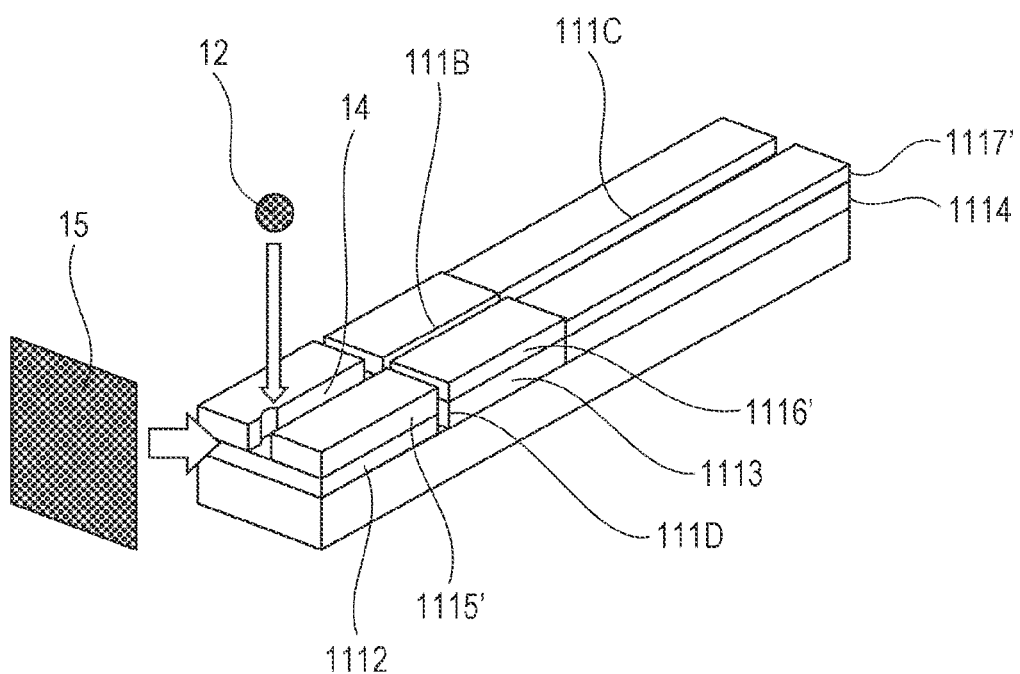
FIG. 3 is a diagram schematically illustrating a second state in the method for manufacturing the signal light transmission member according to the first embodiment of the present invention.

As shown in FIG. 3, the bottom plate 1111, the middle plates 1112 to 1114, and the upper plates 1115 to 1117 and 1115' to 1117' are bonded together with a dedicated adhesive in the above arrangement. As a result, a base part is formed having the widest groove in which the lens holding part 111A faces between the upper plates 1115 and 1115', the narrowest groove 111B between the upper plates 1116 and 1116', and a groove 111C slightly wider than the groove 111B between the upper plates 1117 and 1117' along the longitudinal direction, and having a groove 111D along the lateral direction between the upper plates 1115 and 1115' and the upper plates 1116 and 1116'.

Next, a cover glass 15, which is a glass plate that transmits laser light, is bonded to one end face of the base part on the upper plate 1115 side. It is desirable to use a light transmission material constituting the light transmission part 14 as the adhesive. However, the adhesive may not be identical to the light transmission material as long as the adhesive does not intrude into the void part to be the light transmission part 14.

Next, the AR coated lens 12 is pressed into and fixed to a portion of the opposing lens holding parts 111A in the groove between the upper plates 1115 and 1115'. Accordingly, the AR coated lens 12 is sandwiched at a specific position corresponding to the lens holding parts 111A.

Figure 4:
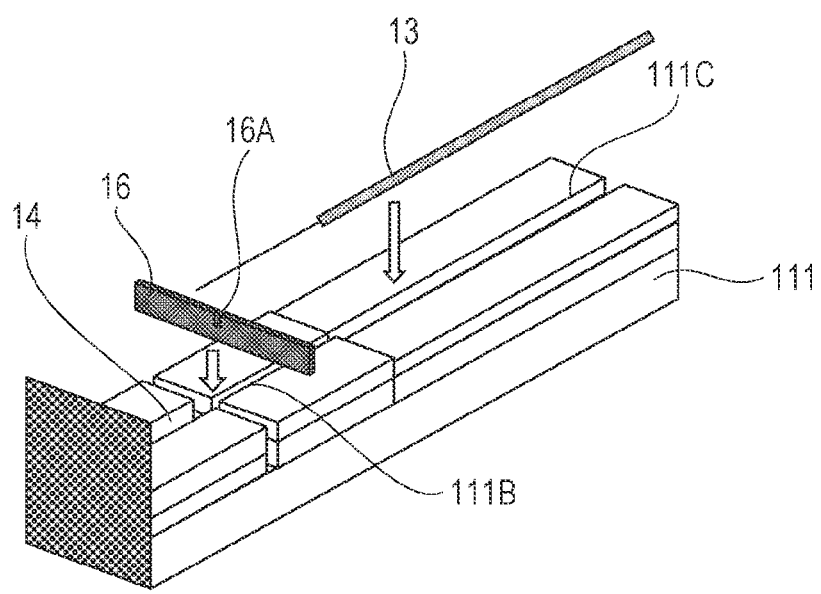
FIG. 4 is a diagram schematically illustrating a third state in the method for manufacturing the signal light transmission member according to the first embodiment of the present invention.

Next, as illustrated in FIG. 4, thin plate glass 16 for finely adjusting the orientation of the optical fiber 13 is fitted into the groove 111D. The thin plate glass 16 has a slit 16A in which the core wire of the optical fiber 13 is housed. The slit 16A is a groove for easily moving the optical fiber 13 and adjusting the position thereof. The thin plate glass 16 may have a through hole may be provided instead of the slit 16A. However, the thin plate glass 16 may not have the slit 16A or the through hole.

The optical fiber 13 has a core wire (a core material and a clad material) at the leading portion, and further has a protective sleeve at the other portion. The core wire at the leading end side of the optical fiber 13 is housed in the gap part to be the light transmission part 14, the slit 16A, and the groove 111B, and the protective sleeve behind the gap part is housed in the groove 111C.

Figure 5:
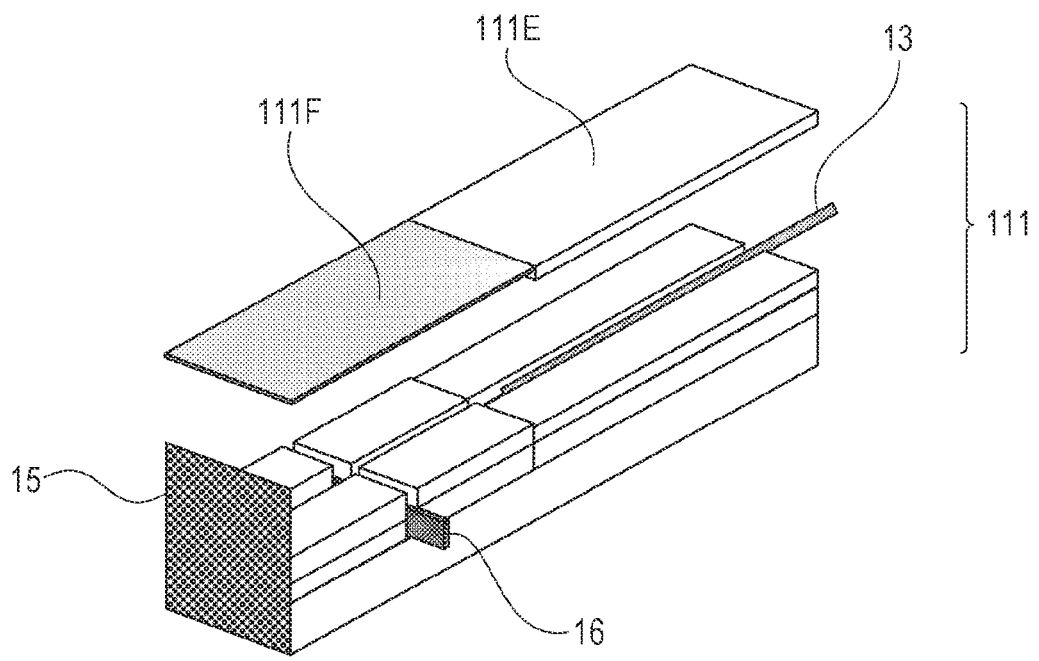
FIG. 5 is a diagram schematically illustrating a fourth state in the method for manufacturing the signal light transmission member according to the first embodiment of the present invention.

Next, as illustrated in FIG. 5, the groove 111B, the groove 111C, and the void portion are filled with a light transmission material, for example, a UV-curable resin material. Then, the upper plates 1117 and 1117' and the groove 111C are covered with the cover 111E from above, and the upper plates 1115 and 1115', the upper plates 1116 and 1116', the void part, the grooves 111B and 111D are covered with the cover 111F, taking care not to allow air to enter the filled light transmission material. Covering the groove 111C with the cover 111E forms a hole 112.

Next, the position of the optical fiber 13 is adjusted with respect to the AR coated lens 12. For example, the base part before curing the light transmission material is placed on an optical fiber checker. Then, the position of the leading end of the optical fiber 13 with respect to the AR coated lens 12 is determined while visible laser light is passed through the optical fiber 13 and the image of the laser light on the checker is visually checked. At this time, the thin plate glass 16 is finely adjusted vertically and horizontally to adjust the position of the core wire of the optical fiber 13. In this way, the position of the leading end of the optical fiber 13 with respect to the AR coated lens 12 is adjusted to the focal position of the AR coated lens 12.

Next, the resin material filling the groove 111C is irradiated with ultraviolet rays using a spot type LED ultraviolet irradiation device through the cover glass 15 and the cover 111E to fix the front and back positions of the optical fibers 13.

Next, the position of the thin plate glass 16 is finely adjusted vertically and horizontally to adjust the position of the optical fiber 13. In this way, the position of the leading end of the optical fiber 13 with respect to the AR coated lens 12 is aligned with the position of irradiation of the laser beam straight forward. Next, the resin material filling the void part and the groove 111B is irradiated with ultraviolet rays to fix the upper, lower, left, and right positions of the optical fiber 13. The resin material becomes a cured resin by a polymerization reaction of the resin material by the irradiation of the ultraviolet rays. As a result, the light transmission part 14 of the cured resin with the AR coated lens 12 embedded is formed, and the optical fiber 13 is fixed at the adjusted position as described above. Thus, the signal light transmission member 10 is obtained.

The above example corresponds to an example in which a light transmission part is produced from a resin material by a radical polymerization reaction by light. In addition, depending on the type of the resin material, the light transmission part can be produced from the resin material by various reactions such as an epoxy polymerization reaction, a vinyl polymerization reaction, a carbonyl condensation reaction, and a polyurethane reaction.

Covering the signal light transmission member 10 with a resin or metal housing as necessary makes it possible to provide the signal light transmission member 10 with a function as a one-touch connector or a function as a multi-connector.

The base part in the manufacturing process of the signal light transmission member 10 can be manufactured by a method other than bonding of the plate materials, for example, other methods such as manufacturing with a 3D printer, cutting, or injection molding.

[Optical Features]

Figure 6:
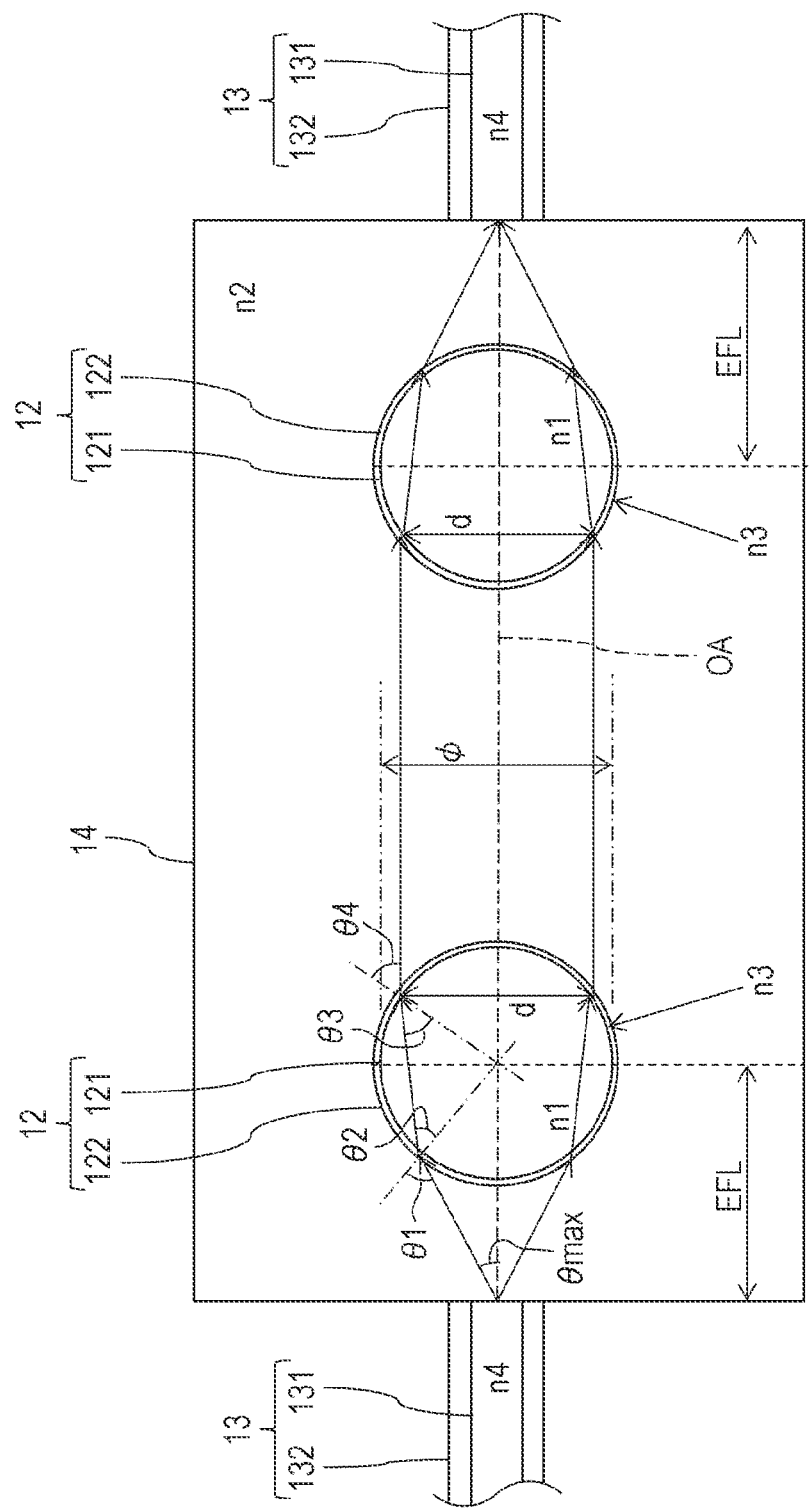
FIG. 6 is a diagram for describing optical features of the signal light transmission member according to the first embodiment of the present invention.

FIG. 6 is a diagram for describing optical features of the signal light transmission member according to the first embodiment of the present invention. FIG. 6 schematically illustrates an optical configuration of the signal light transmission member 10. In the following description, the signal light is laser light, and the lens is a ball lens.

The laser light emitted from the optical fiber 13 spreads from the end surface of the optical fiber, passes through the AR coated lens 12, and is emitted (collimated) as parallel light. The collimated light is condensed on the core material 131 of the optical fiber 13 located in the vicinity of the focal position by the AR coated lens 12 on the light receiving side.

On the emission side, the laser light passes through three interfaces, that is, the end surface of the optical fiber, the interface of entry into the ball lens, and the interface of emission from the ball lens. On the light receiving side, the light passes through the above interfaces in reverse order. As described above, in the form of the optical communication connector, the laser light passes through six interfaces in total.

Herein, the refractive index of the lens 121 of the AR coated lens 12 is designated as n1, and the refractive index of the light transmission part 14 is designated as n2. In the signal light transmission member 10, the refractive index n1 of the lens 121 is smaller than the refractive index n2 of the light transmission part 14. Then, the anti-reflective coating 122 that suppresses reflection of light with a wavelength used for optical communication is formed at an interface portion between the AR coated lens 12 and the light transmission part 14. Accordingly, reflection is less likely to occur at the interface in the case of large refraction at the interface, and the loss of the laser light is suppressed as compared to the case without the refractive index relationship described above.

From the viewpoint of suppressing reflection of the laser light emitted from the end surface of the optical fiber 13 into the light transmission part 14 or scattering of the laser light due to chipping of the end surface or the like, the refractive index n2 of the light transmission part 14 is desirably close to the refractive index of the core material 131 of the optical fiber 13. Assuming that the core material 131 is quartz and the refractive index of the core material 131 of the optical fiber 13 is n4, the signal light transmission member 10 preferably satisfies the following equation (1) from the above viewpoint:

$$n4-0.14 \leq n2 \leq n4+0.14 \quad (1).$$

The equation (1) defines the relationship between the refractive index n4 of the core material of the optical fiber 13 and the refractive index n2 of the light transmission part 14. When the signal light transmission member 10 satisfies the equation (1), the reflectance at the interface between the optical fiber 13 and the light transmission part 14 becomes 0.2% or less to 0.1% or less, and the loss of the light emitted from the optical fiber 13 can be sufficiently reduced.

If the refractive index n2 is too small, options of resin materials for forming the light transmission part 14 are limited, and it may be difficult for the optical characteristics to satisfy a linear thermal expansion coefficient, a haze value, laser light resistance, and the like, for example.

If the refractive index n2 is too large with respect to the refractive index n4, the reflectance at the interface between the optical fiber 13 and the light transmission part 14 increases. Therefore, n2 is preferably n4−0.14 or more, and more preferably n4−0.10 or more from the viewpoint of the resin material constituting the light transmission part 14.

In addition, n2 is preferably n4+0.14 or less from the viewpoint of reflectance at the interface between the optical fiber 13 and the light transmission part 14.

The value of the difference between the refractive index n2 and the refractive index n4, that is, the value of $\Delta(n2-n4)$ are desirably small from the viewpoint of suppressing reflection or scattering of the laser light described above.

The value of the refractive index difference between the refractive index n1 of the lens 121 and the refractive index n2 of the light transmission part 14, that is, the value of $\Delta(n1-n2)$ is large from the viewpoint of allowing the AR coated lens 12 in contact with the light transmission part 14 to sufficiently play a role as a lens.

The value of the refractive index difference between the refractive index n1 of the lens 121 and the refractive index n2 of the light transmission part 14, that is, the value of $\Delta(n1-n2)$ is large from the viewpoint of allowing the AR coated lens 12 to control the laser light by collimating the laser light more largely.

In the signal light transmission member 10, a focal length EFL is preferably short. Although there is a commercial value that it is advantageous from the viewpoint of miniaturization, if the focal length is long, the optical path length of the laser light passing through the light transmission part 14 becomes long, which leads to a loss of an optical signal. Therefore, it is desirable that the focal length EFL is short.

For this purpose, advantageously, the refractive index n1 of the lens 121 is high and the refractive index n2 of the light transmission part 14 is low. The value of the refractive index difference $\Delta(n1-n2)$ between the refractive index n1 of the lens 121 and the refractive index n2 of the light transmission part 14 is desirably large. From the above viewpoints, the signal light transmission member 10 preferably satisfies the following equation (2):

$$n1-n2 \geq 0.19 \quad (2)$$

From the above viewpoints, the value of the refractive index difference $\Delta(n1-n2)$ from the refractive index n2 of the light transmission part 14 is more preferably 0.25 or more, still more preferably 0.42 or more.

When the anti-reflective coating 122 is a single-layer coating, the average refractive index n3 of the single-layer coating is preferably smaller than the refractive index n1 of the lens and larger than the refractive index n2 of the light transmission part from the viewpoint of suppressing reflection or scattering of signal light between optical elements in the signal light transmission member 10. When n3 does not satisfy equation (3), the antireflection performance of the anti-reflective coating 122 decreases, and the reflectance at the interface between the light transmission part 14 and the lens 121 increases. If the anti-reflective coating 122 is a single-layer coating, the signal light transmission member of the present embodiment preferably satisfies the following equation (3) from the above viewpoints:

[Mathematical Expression 1]

$$\sqrt{(n1 \times n2)} - 0.02 \leq n3 \leq \sqrt{(n1 \times n2)} + 0.02 \quad (3)$$

The relationship shown in the equation (3) is established when the interface reflectance of the anti-reflective coating 122 of the AR coated lens 12 is substantially zero.

The signal light transmission member 10 preferably selects a suitable refractive index n1 of the lens 121 based on a numerical aperture NA of the intended optical fiber 13. For example, if the refractive index n2 of the light transmission part 14 is the same as the refractive index 1.46 of quartz which is the core material of the optical fiber 13, the refractive index n1 is preferably 1.82 or more when NA is 0.52, the refractive index n1 is preferably 1.74 or more when NA is 0.42, the refractive index n1 is preferably 1.66 or more when NA is 0.32, the refractive index n1 is preferably 1.58 or more when NA is 0.22, and the refractive index n1 is preferably 1.52 or more when NA is 0.12.

When the refractive index n1 satisfies the above relationship with NA, a beam diameter d enlarged by the ball lens is 90% or less of the diameter p of the ball lens. This enables designing with a margin even for disturbance factors such as axial misalignment due to connector connection, which is advantageous from the viewpoint of exhibiting stable performance regardless of the presence or absence of the disturbance factors.

The refractive index n1 of the lens with respect to the NA can be determined by calculating, on the basis of Snell's law, an incident angle θ1 of the laser light entering from the light transmission part 14 with the refractive index n2 to the AR coated lens 12 that is a ball lens, a refractive angle θ2 of the laser light at the incident point on the AR coated lens 12, an emission angle θ3 of the laser light from the AR coated lens 12 to the light transmission part 14, and a refractive angle θ4 of the laser light at the emission point from the AR coated lens 12.

The focal length EFL of the AR coated lens 12 that is a ball lens in the signal light transmission member 10 can be determined by equation (4). The numerical aperture NA of the optical fiber 13 in the signal light transmission member 10 can be determined by equation (5). In the equation, "θmax" indicates the maximum angle of the beam in the light emitted from the optical fiber 13 to the light transmission part 14 with the refractive index n2. In addition, "φ" indicates the diameter of the ball lens.

$$EFL = n1 \cdot \varphi / 4(n4 - n2) \quad (4)$$

$$NA = n2 \cdot \sin \theta \max \quad (5)$$

[Specific Calculation Examples of Optical Features]

Based on the Fresnel equation, the reflectance generated at the interface was calculated using the refractive index difference and the incident angle from the light transmission part 14 to the AR coated lens 12, and the total loss due to the interface reflection in the signal light transmission member 10 was calculated. It is assumed that the core material 131 of the optical fiber 13 is quartz with a refractive index of 1.46, the refractive index of the light transmission part in contact with the optical fiber is 1.46, the lens of the AR coated lens 12 is a ball lens, the refractive index of the glass material of the ball lens is 1.94, and the laser light has a Gaussian distribution.

In a case where the regular reflectance at the incident angle of 0° at the interface with the light transmission part 14 is suppressed to 0.1% or less by the anti-reflective coating 122 at the interface of the AR coated lens 12, a calculation result is obtained in which almost 100% of the emitted laser light reaches the optical fiber on the light receiving side.

Comparison Example 1

In a case where the AR coated lens 12 does not have the anti-reflective coating 122 (that is, only the lens 121), about 2.4% of reflection occurs at the interface between the light transmission part 14 and the lens 121. Therefore, the laser light reaching the optical fiber on the light receiving side is about 91% of the emitted light.

Comparison Example 2

A case where similar calculation is performed for the connector in JP 2003-255184 A will be described. Since JP 2003-255184 A describes that the refractive index of the resin corresponding to the light transmission part is 1.5 and the refractive index of the ball lens is 1.7 or more, it is presumed that the optical fiber with the refractive index 1.5 of the core material is a plastic fiber. However, due to Snell's law, the refraction at the interface between the lens and the resin is considerably reduced. When the refraction of light is small, the lens in the resin hardly plays a role as a lens.

When equation (5) described above is applied and 1.5 is substituted for n2 in equation (5), the divergence angle θmax of the laser beam emitted from the optical fiber with NA=0.5 into the resin is approximately 20° because no refraction occurs at the interface between the optical fiber and the resin.

As described above, in the expanded beam connector described in JP 2003-255184 A in which the refractive index of the resin is 1.5 and the refractive index of the ball lens is 1.7, the distance between the lens and the optical fiber is too long to collimate the light, and as a result, more than half of the optical signal is lost.

Major Operation and Advantageous Effects

The signal light transmission member 10 includes the lens 121 with the refractive index n1, the light transmission part 14 with the refractive index n2, and the anti-reflective coating 122. Therefore, the loss of the signal light due to the reflection between the optical elements is suppressed, and it is advantageous for suppressing the signal quality deterioration in addition to suppressing the loss of the signal light in the signal light transmission member 10 as compared with the case where the light transmission part 14 is not included or the anti-reflective coating 122 is not included.

Since the refractive index 4 of the optical fiber 13 satisfies the above-described equation (1), the loss of the signal light in the signal light transmission member 10 is further suppressed.

Since both the signal light transmission members 10 and 10' have the cover glasses 15 and 15', it is possible to achieve a configuration in which the air gap between the light transmission parts 14 is substantially replaced with glass when used as a connector. Therefore, the occurrence of scattering of the laser light on the surfaces of the light transmission part 14 and the air gap is suppressed, which is advantageous from the viewpoint of improving signal quality.

The cover glass 15 has a coating for preventing reflection on each main surface, which is advantageous from the viewpoint of reducing a loss of signal light due to reflection at the surface and the interface of the cover glass 15.

Second Embodiment

Figure 7:
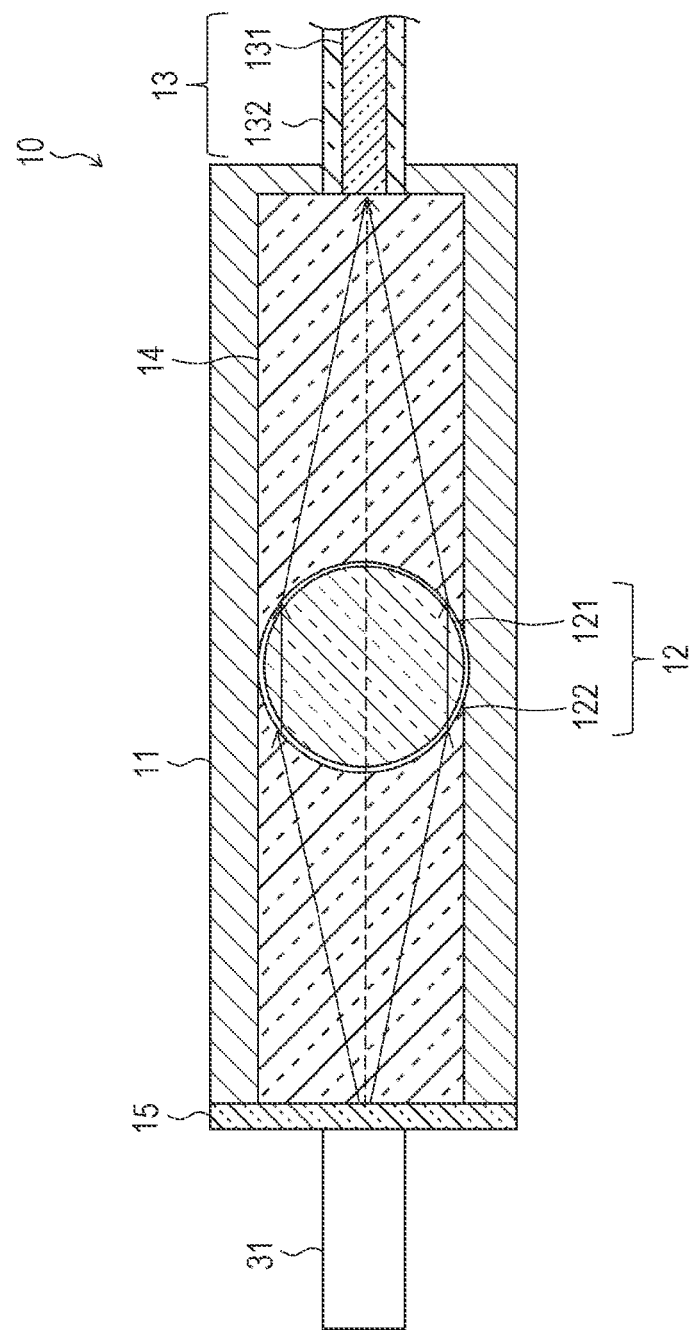
FIG. 7 is a diagram schematically illustrating a configuration of a signal light transmission member according to a second embodiment of the present invention.

FIG. 7 is a diagram schematically illustrating a configuration of a signal light transmission member according to a second embodiment of the present invention. The signal light transmission member of the present embodiment is a member for connecting a semiconductor laser module and an optical fiber, and has substantially the same structure as that of the first embodiment in which one signal light transmission member is replaced with a semiconductor laser module. For convenience of description, members having the same functions as the members in the above embodiment described above are denoted by the same reference numerals, and the description thereof will not be repeated.

As illustrated in FIG. 7, a signal light transmission member 10 is arranged to face a semiconductor laser module 31. The laser light emitted from the semiconductor laser module 31 becomes collimated light in an AR coated lens 12, and is emitted from the lens and converged toward a core material 131 of an optical fiber 13. In the embodiment of FIG. 7, the signal light transmission member 10 collects the signal light emitted from the semiconductor laser module 31 by one lens to the end of the optical fiber 13 on the light receiving side. Therefore, from the viewpoint of downsizing the signal light transmission member 10, a focal length EFL is preferably short, and therefore, a refractive index n1 of a lens 121 is preferably high. For example, the refractive index n1 of the lens 121 is preferably 1.9 or more.

Third Embodiment

Figure 8:
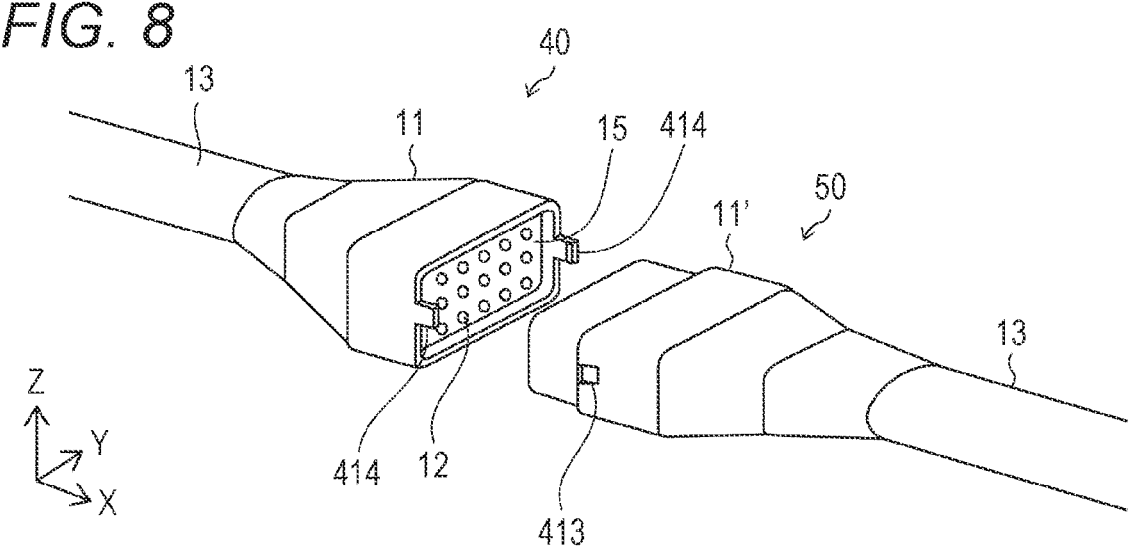
FIG. 8 is a diagram schematically illustrating a configuration of a signal light transmission member according to a third embodiment of the present invention.
Figure 9:
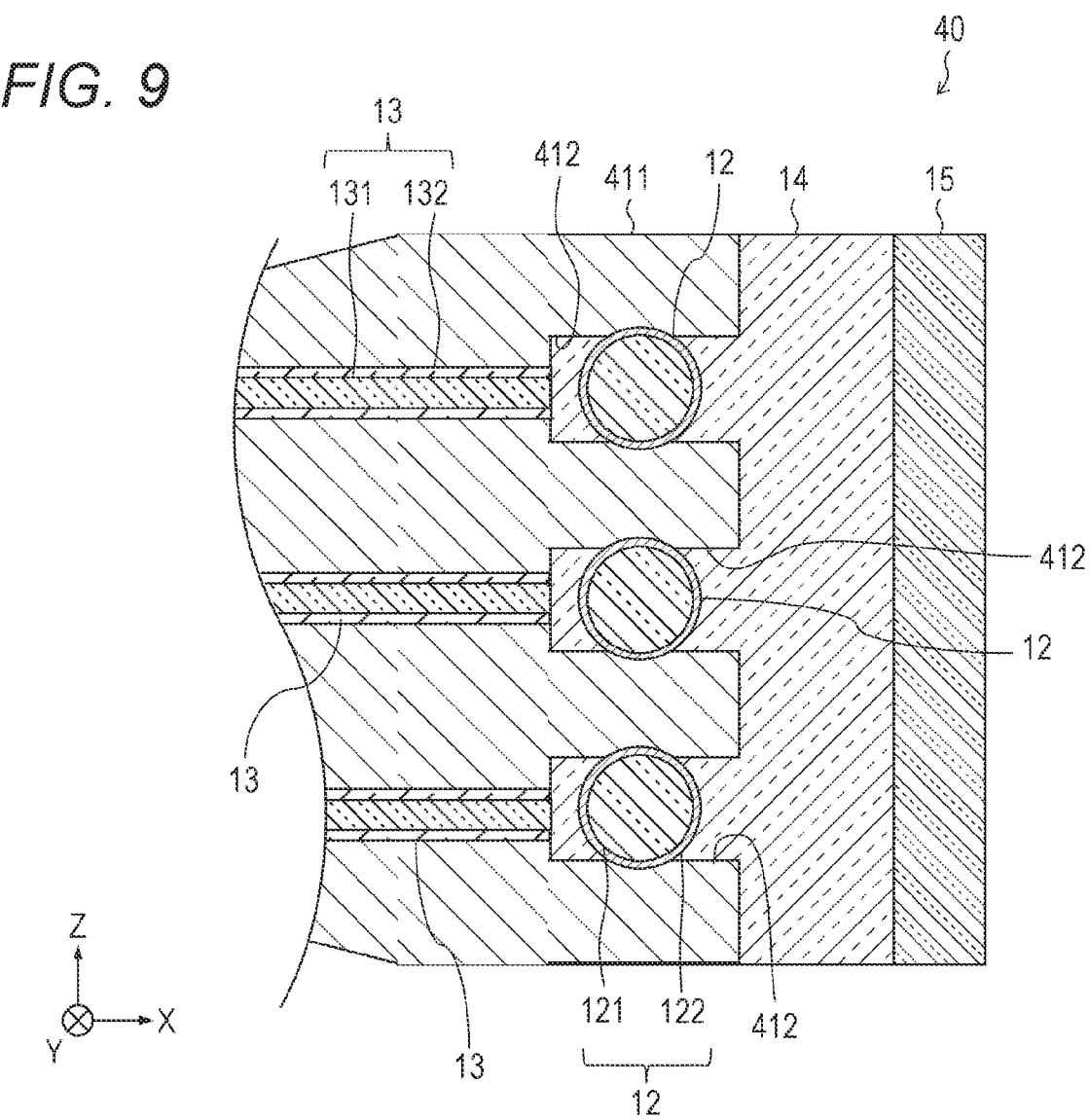
FIG. 9 is a diagram schematically illustrating a cross section of the signal light transmission member in FIG. 8 taken along an XZ plane.

FIG. 8 is a diagram schematically illustrating a configuration of a signal light transmission member according to a third embodiment of the present invention, and FIG. 9 is a diagram schematically illustrating a cross section of the signal light transmission member in FIG. 8 taken along an XZ plane. The signal light transmission member of the present embodiment has an array structure integrally including a plurality of AR coated lenses 12. Except for this, the signal light transmission member of the present embodiment has the same configuration as the signal light transmission member in the first embodiment described above. For convenience of description, members having the same functions as the members in the above embodiment described above are denoted by the same reference numerals, and the description thereof will not be repeated.

As illustrated in FIG. 8, a signal light transmission member 40 and a signal light transmission member 50 are connectable. That is, the opening of a housing part 11 of the signal light transmission member 40 can be externally fitted to the opening of a housing part 11' of the signal light transmission member 50. The housing part 11' has a recess 413 formed in a side portion, and the housing part 11 has a claw portion 414 that protrudes from a side edge portion of the opening thereof and is detachably engaged with the recess 413 when the housing part is externally fitted. In the signal light transmission members, the recess 413 and the claw portion 414 constitute a coupling part that couples the housing part 11 to the housing part 11' of the signal light transmission member 50. With the coupling structure, the housing part 11 of the signal light transmission member 40 is coupled to the housing part 11' of the signal light transmission member 50 such that the transparent window of the signal light transmission member 40 faces and is parallel to the transparent window of the signal light transmission member 50 or the transparent windows are in close contact with each other. Both the signal light transmission member 40 and the signal light transmission member 50 have a plurality of (for example, 15) AR coated lenses 12 in an integrated member, and have substantially the same structure except for the above-described coupling structure.

As illustrated in FIG. 9, a main body part 411 of the signal light transmission member 40 includes a plurality of recesses 412 arranged in a planar direction when viewed along the optical axis (X direction). The main body part 411 has a total of 15 recesses 412, three in the Z direction and five in the Y direction, when viewed along the X axis. The shape of each recess 412 is a quadrangular prism, for example, and the AR coated lens 12 is arranged in each recess 412 and embedded in a light transmission part 14. An optical fiber 13 is connected to the bottom of each recess 412. An anti-reflective coating is formed on each main surface of the cover glass 15.

According to the present embodiment, it is possible to simultaneously transmit a plurality of rays of signal light to one signal light transmission member via the plurality of optical fibers 13 and the AR coated lenses 12 corresponding to the optical fibers 13.

[Method for Manufacturing Lens with Single-Layered Interface Anti-Reflective Coating]

Overview

The lens with an anti-reflective coating at the lens interface used in the embodiment of the present invention (hereinafter, also referred to as "AR coated lens") can be prepared by using the alternate lamination method. The following description relates to a method for manufacturing an AR coated lens using the alternate lamination method. The single-layered anti-reflective coating according to the present invention is intended to prevent reflection at the interface between the resin and the lens.

Conventionally, sheet-like antireflection elements have been used in display devices of some electronic apparatuses. As an example of a technique for producing such an optical element, there is a technique for producing an anti-reflective coating by the alternate lamination method (for example, see JP 2010-217935 A).

According to an embodiment of the present invention, there is provided a method for manufacturing a homogeneous anti-reflective coating on a lens having a three-dimensional shape, by forming the anti-reflective coating on the lens by the alternate lamination method.

A method for manufacturing an AR coated lens according to the embodiment of the present invention is a method for manufacturing an AR coated lens, the method including: a first step of immersing a lens in a polymer electrolyte solution; and a second step of immersing the lens having been immersed in the polymer electrolyte solution in a sol of material particles of an anti-reflective coating, in which the first step and the second step are repeated to form an anti-reflective coating including a layer of the material particles at an interface of the lens, and the lens is used in a state of being housed in a liquid permeable container. According to this manufacturing method, it is possible to manufacture a lens with a homogeneous anti-reflective coating. Hereinafter, the manufacturing method will be described in more detail.

[Embodiment of Method for Manufacturing AR Coated Lens]

The method for manufacturing an AR coated lens includes the first step of immersing a lens in a polymer electrolyte solution, and a second step of immersing the lens having been immersed in the polymer electrolyte solution in a sol of material particles of an anti-reflective coating.

As the lens, the above-described lens body can be used. Since a homogeneous anti-reflective coating can be formed regardless of the shape of the lens, it is preferable to use a ball lens as the lens.

In the first step, the lens is immersed in the polyelectrolyte solution. The polymer electrolyte in the polymer electrolyte solution is appropriately selected from components attached to the interface of the lens by electrostatic interaction. If the interface of the lens exhibits a negative electrostatic action, the polymer electrolyte can be selected from polymer compounds containing a positive charge. Examples of the polymer electrolyte include poly(diallyldimethylammonium chloride), polyallylamine, and polyethyleneimine.

In the second step, the lens having been immersed in the polymer electrolyte solution is immersed in the sol of material particles of the anti-reflective coating. The material of the material particles is selected as appropriate from components that exhibit a desired refractive index as an anti-reflective coating and adhere to the polymer electrolyte on the lens by electrostatic interaction. When the polymer electrolyte exhibits a positive electrostatic action, the material particles can be selected from inorganic or organic fine particles containing a negative charge. Examples of the material of the material particles include silica, alumina, titania, antimony, tin oxide, niobium oxide, and the like. The material may be of one kind or more kinds.

In the above manufacturing method, the first step and the second step are repeated to form an anti-reflective coating including a layer of material particles at the interface of the lens. The number of repetitions of the first step and the second step can be determined as appropriate according to a desired thickness of the anti-reflective coating. The larger the number of repetitions, the thicker the anti-reflective coating can be.

In the above manufacturing method, the lens is set in a state of being stored in a liquid-permeable container. Therefore, it is possible to repeatedly immerse the lens in different treatment liquids without contacting the lens. The liquid-permeable container may be any container as long as the lens can be immersed in the above-described liquid. However, the liquid-permeable container is preferably a metal mesh basket from the viewpoint of liquid permeability, strength, and stability. The metal as the material of the basket may be any material as long as it is stable in the immersion in the first step and the second step. Examples of the container material include stainless steel and ceramic. The container material is preferably stainless steel from the viewpoint of chemical stability and workability.

The above manufacturing method may further include a step other than the first step and the second step as long as the effect of the production method can be obtained. For example, the above manufacturing method may further include a third step of immersing the lens having a layer of material particles in the curing agent material solution.

The curing agent material of the curing agent material solution and the curing agent material solution may be of one kind or more kinds. The third step may be immersion in two or more curing agent material solutions. The immersion in the curing agent material solution may be performed only once or twice or more. With the third step, the material particles can be bound by the curing agent in the anti-reflective coating. Therefore, further including the third step is preferable from the viewpoint of enhancing the durability of the anti-reflective coating. Examples of the curing agent material include various silane coupling agents and alkyl silicates.

The above manufacturing method may further include a heating step of heating the lens having been immersed in the curing agent material solution to generate a curing agent. The heating temperature in the heating step is desirably at least 80° C. or higher. However, the heating temperature is desirably optimized by an external constraint such as a reaction mechanism of the curing agent, an expansion coefficient of the lens, or a Young's modulus of an anti-reflective coating to be formed.

The above manufacturing method may further include a step of impregnating the layer of material particles with a curable monomer of a cured resin, and a step of polymerizing the curable monomer in which the layer of material particles has been impregnated to produce an anti-reflective coating containing the cured resin. The cured resin may be the cured resin of the light transmission part described above. The curable monomer may be a compound that generates the cured resin by a polymerization reaction, and can be determined as appropriate according to the types of the cured resin and the polymerization reaction. The curable monomer may be used in combination with a polymerization initiator as necessary.

The method for impregnating the layer of material particles with the curable monomer is appropriately selected from methods by which voids in the layer of material particles can be sufficiently filled with the curable monomer. Such methods include a method of applying a curable monomer to the surface of a lens having a layer of resin particles (to the layer of resin particles) and a method of immersing a lens having a layer of resin particles in a curable monomer or a solution thereof. The cured resin may be the resin for the light transmission material described above, and may be the same as or different from the light transmission material in which the AR coated lens is embedded in the housing part of the signal light transmission member. Impregnating the layer of resin particles with the curable monomer and then polymerizing the curable monomer makes it possible to form an antireflection layer in which voids of the layer of resin particles are filled with the cured resin. As described above, in the present embodiment, the fine particle composition and the curing agent component are tuned so that the state filled with the cured resin has a prescribed refractive index.

The refractive index of the AR coating formed at the interface between the lens and the light transmission material and composed of the fine particle composition, the curing agent component, and the cured resin may be difficult to measure by a direct measurement method because the reflectance is too low. In this case, for example, an AR coating having the same composition is formed on a silicon wafer and is subjected to optical evaluation by an ellipsometer or the like, whereby the refractive index of the AR coating to be formed can be estimated.

The above manufacturing method may further include a cleaning step of cleaning the lens prior to the first step. The cleaning step is preferable from the viewpoint of stabilizing the initial adhesion of the electrolyte polymer to the lens interface in the alternate lamination method. If the lens is glass, cleaning the lens with an alkaline lens cleaning solution is preferable from the viewpoint of surface cleanness and hydrophilization of the lens surface.

The above manufacturing method may further include a water washing step of removing an excessively attached component in advance before immersing the lens in a different liquid. The water washing can be performed by soaking the basket storing the lens in a pure water tank storing pure water to immerse the lens in pure water.

In addition, in the above manufacturing method, various configurations for enhancing the posture stability of the ball lens in the liquid-permeable container may be adopted. For example, a portion of the lens other than the portion serving as the optical path of the signal light may be recessed. Alternatively, the above manufacturing method may be performed in a state in which a gripping portion for gripping the ball lens is arranged in a portion other than the portion serving as the optical path in the liquid permeable container and the ball lens is gripped by the gripping portion. Alternatively, the container may further include a concave or convex portion that restricts movement and posture change of the lens. The concave or convex portions may be one concave portion that is in contact with the curved surface of the lens at the opening end edge, or three convex portions that are supported at three points with respect to one lens, for example. Since this configuration makes it possible to appropriately support the lens in a portion of the lens other than the portion through which the signal light passes, it is suitable for easily manufacturing a homogeneous anti-reflective coating by the lens interface.

The AR coated lens obtained by the above manufacturing method can be suitably used for a connector and in various forms for connection or coupling of a member for transmitting signal light in optical communication.

[Summary of Method for Manufacturing AR Coated Lens]

A first aspect of a method for manufacturing an AR coated lens according to the embodiment of the present invention is a method for manufacturing an AR coated lens, the method including: a first step of immersing a lens in a polymer electrolyte solution; and a second step of immersing the lens having been immersed in the polymer electrolyte solution in a sol of material particles of an anti-reflective coating, in which the first step and the second step are repeated to form an anti-reflective coating including a layer of the material particles at an interface of the lens, and the lens is used in a state of being housed in a liquid permeable container. According to the first aspect, it is possible to manufacture a lens with a homogeneous anti-reflective coating.

A second aspect of the method for manufacturing an AR coated lens may further include a third step of immersing the lens having a layer of material particles in the curing agent material solution in the first aspect. The second aspect is more effective from the viewpoint of enhancing the durability of the anti-reflective coating.

A third aspect of the method for manufacturing an AR coated lens may further include a heating step of heating the lens having been immersed in the curing agent material solution to generate a curing agent in the second aspect. The third aspect is more effective from the viewpoint of enhancing the durability of the anti-reflective coating.

A fourth aspect of the method for producing an AR coated lens may further include, in any one of the first aspect to the third aspect, a step of impregnating the layer of material particles with a curable monomer of a cured resin, and a step of polymerizing the curable monomer having been impregnated in the layer of material particles to produce an anti-reflective coating containing a cured resin. The fourth aspect is more effective from the viewpoint of enhancing the durability of the anti-reflective coating and further enhancing the refractive index.

In a fifth aspect of the method for manufacturing an AR coated lens, a ball lens may be used as the lens in any of the first to fourth aspects. The fifth aspect is more effective because it is possible to produce a homogeneous anti-reflective coating even in a ball lens in which it is usually more difficult to produce a homogeneous anti-reflective coating.

In a sixth aspect of the method for manufacturing an AR coated lens in any of the first to fifth aspects, a metal mesh basket may be used as a liquid permeable container. The sixth aspect is more effective from the viewpoint of producing a homogeneous anti-reflective coating because the anti-reflective coating can be produced while the lens is stored in a stable container from the beginning to the end. The sixth aspect is also suitable for easily producing an AR coating on the entire surface of the lens.

[Specific Examples of Method for Manufacturing AR Coated Lens]

Example 1

(Preparation of Liquids 1 to 4 for Immersion Treatment)

20 g of Semiclean (registered trademark) manufactured by Yokohama Oils & Fats Industry Co., Ltd. was added to 1 L of pure water, and the mixture was stirred with a magnetic stirrer to obtain a liquid 1. The liquid 1 is an alkaline glass washing solution.

20 g of 28% aqueous solution of poly(diallyldimethylammonium chloride) manufactured by Polysciences, Inc. was added to 1 L of pure water, and the mixture was stirred with a magnetic stirrer and filtered with a 0.2 micron hydrophilic PTFE filter to obtain a filtrate as a liquid 2. The liquid 2 is a polymer electrolyte aqueous solution.

50 g of antimony pentoxide ELCOM (registered trademark) manufactured by JGC Catalysts and Chemicals Ltd. was added to 1 L of pure water, stirred with a magnetic stirrer, filtered with a 0.2 micron hydrophilic PTFE filter to obtain a filtrate as a liquid 3. The liquid 3 is a sol of material particles of the antimony sol aqueous dispersion anti-reflective coating.

20 g of COLCOAT N103-X manufactured by Colcoat Co., Ltd. was added to 1 L of pure water, stirred with a magnetic stirrer, and filtered with a 0.2 micron hydrophilic PTFE filter to obtain a filtrate as liquid 4. The liquid 4 is an ethyl silicate aqueous solution and is a curing agent material solution.

(Preparation of Anti-Reflective Coating)

Using the ball lens in Example 1 described later, a single-layer coating made of antimony particles was formed on the ball lens by the following procedure:
  (1) The ball lens was stored in a SUS mesh basket.
  (2) The basket was soaked in the liquid 1, so that the ball lens in the basket was immersed in and washed by the liquid 1.

(3) The basket was soaked in pure water in a bath for water washing, so that the ball lens in the basket was rinsed with the pure water, and the alkali component remaining on the interface of the ball lens was removed.

(4) The ball lens in the basket was immersed in the liquid 2.

(5) The ball lens in the basket was immersed in pure water and was rinsed with pure water to remove excessive polyalkyl dimethyl ammonium chloride attached to the ball lens and the basket.

(6) The ball lens in the basket was immersed in the liquid 3.

(7) The ball lens in the basket was immersed in and rinsed with pure water to remove an excessive antimony sol on the ball lens.

(8) With the steps (4) to (7) as one cycle, the cycle was repeated until the number of cycles at which the laminated coating had a desired thickness.

(9) The ball lens in the basket was immersed in a silane coupling agent aqueous solution.

(10) The ball lens in the basket was immersed in and rinsed with pure water to remove an excessive silane coupling agent.

(11) The ball lens in the basket was immersed in the liquid 4.

(12) The ball lens in the basket was immersed in and rinsed with pure water to remove excessive ethyl silicate.

(13) With steps (9) to (12) as one cycle, two or more cycles were repeated.

(14) The ball lens in the basket was immersed in IPA and was air-dried. The moisture in the coating on the ball lens was replaced with the IPA, and the IPA was removed from the coating by air drying.

(15) The ball lens in the basket was placed in an oven and heated at 200° C. for three hours.

The above operations were performed to obtain a ball lens having a single-layer coating made of an antimony sol with a refractive index of 1.49. The thickness of the single-layer coating was 210 nm.

Furthermore, the single-layer coating was impregnated with a monomer of a UV curable resin, and the monomer was polymerized by UV irradiation to obtain a ball lens having a UV curable resin in voids in the single-layer coating. The average refractive index of the single-layer coating of this ball lens was about 1.7.

Example 2

(Preparation of Liquid 5 for Immersion Treatment)

50 g of Cataloid (registered trademark) manufactured by JGC Catalysts and Chemicals Ltd. was added to 1 L of pure water, stirred with a magnetic stirrer, and filtered with a 0.2 micron hydrophilic PTFE filter. A silica sol dispersion liquid that had been passed through the filter and the liquid 3 were mixed so that the ratio of silica sol/antimony sol was 1/3, thereby to obtain a liquid 5. The liquid 5 is an antimony sol/silica sol mixed dispersion liquid.

(Preparation of Anti-Reflective Coating)

Using a ball lens in Example 3 described later, a single-layer coating made of antimony/silica mixed particles was formed on the ball lens in the same manner as in Example 1 described above except that the ball lens was ultrasonic washed in a state of being immersed in step (2), the liquid 5 was used in place of the liquid 3 in step (6), the liquid 2 was used in place of the silane coupling agent aqueous solution in step (9), the number of repetitions in step (13) was set to five or more, and the heating temperature in step (15) was changed to 120° C. The single-layer coating made of an antimony/silica mixed sol with a refractive index of 1.38 formed on the ball lens had a thickness of 210 nm.

Furthermore, in the same manner as in Example 1, the single-layer coating was impregnated with a monomer of a UV curable resin, and the monomer was polymerized by UV irradiation to obtain a ball lens having a UV curable resin in voids in the single-layer coating. The average refractive index of the single-layer coating of this ball lens was about 1.6.

[Modification of Signal Light Transmission Member]

The present invention is not limited to the above-described embodiments, and various modifications can be made within the scope of the claims. Embodiments obtained by combining as appropriate technical means disclosed in relation to different embodiments are also included in the technical scope of the present invention.

For example, in the foregoing embodiment, the signal light transmission member may have no cover glass, and an air gap may be formed between the signal light transmission member and the counterpart to which signal light is to be transmitted. Instead of the cover glass or the air in the air gap, another medium (for example, water, seawater, oil, vacuum, resin, inorganic substances, or the like) that does not substantially scatter the wavelength of the signal light may be interposed between the signal light transmission member and the counterpart. The optical characteristics for the transmission of the signal light in the signal light transmission member may be tuned depending on the other medium interposed.

In the second embodiment described above, two or more AR coated lenses 12 may be arranged side by side in the optical axis direction. In this case, the optical characteristics of the signal light transmission member are preferably adjusted such that light passing through any one of the AR coated lenses 12 or light passing between any two adjacent AR coated lenses 12 becomes collimated light.

[Summary of Signal Light Transmission Member]

A signal light transmission member (10) according to a first aspect of the present invention includes: a lens (121) that has a refractive index n1 and collimates signal light; a housing part (11) that houses the lens; a light transmission part (14) that has light permeability, has a refractive index n2 smaller than n1, is made of a light transmission material filling the housing part, and has the lens embedded therein; an optical fiber (13) through which the signal light passes, the optical fiber being inserted into the housing part and having an end portion fixed by the light transmission part at a position facing the lens on an optical axis of the lens in the housing part; and an anti-reflective coating (122) that is formed at least at a portion of the optical path of the signal light at the interface between the lens and the light transmission part. If the refractive index of a core material (131) of the optical fiber is designated as n4, the equation (1) below is satisfied. According to the first aspect, since a loss of the signal light in the signal light transmission member is further suppressed, it is possible to achieve the signal light transmission member capable of suppressing a loss of the signal light of optical communication.

$$n4-0.14 \leq n2 \leq n4+0.14 \tag{1}.$$

A signal light transmission member according to a second aspect of the present invention satisfies the equation (2) below in the first aspect. The second aspect is more effective from the viewpoint of downsizing the signal light transmission member and reducing a loss of the signal light in the signal light transmission member.

$$n1-n2 \geq 0.19 \quad (2)$$

In the signal light transmission member according to a third aspect of the present invention, in the first aspect or the second aspect, the anti-reflective coating is a single-layer coating made of at least inorganic fine particles. The third aspect is more effective from the viewpoint of reducing a loss of the signal light in the signal light transmission member.

In a signal light transmission member according to a fourth aspect of the present invention, in the third aspect, if the average refractive index of the anti-reflective coating is designated as n3, the equation (3) below is satisfied. The fourth aspect is more effective from the viewpoint of reducing a loss of the signal light in the signal light transmission member.

[Mathematical Expression 2]

$$\sqrt{(n1 \times n2)}-0.02 \leq n3 \leq \sqrt{(n1 \times n2)}+0.02 \quad (3)$$

In a signal light transmission member according to a fifth aspect of the present invention, in the third aspect or the fourth aspect, the anti-reflective coating includes: antimony particles or mixed particles of antimony particles and silica particles; a binder component curing agent that binds the antimony particles or the mixed particles; and a light transmission material that fills gaps between the antimony particles or the mixed particles and the binder component curing agent. The fifth aspect is more effective from the viewpoint of reducing a loss of the signal light in the signal light transmission member.

In a signal light transmission member according to a sixth aspect of the present invention, in any one of the third to fifth aspects, the anti-reflective coating made of the single-layer coating is formed on the entire surface of the interface. The sixth aspect can more easily form the anti-reflective coating, and is more effective from the viewpoint of manufacturing the signal light transmission member.

In a signal light transmission member according to a seventh aspect of the present invention, in any one of the first to sixth aspects, the lens is a ball lens. The seventh aspect is more effective from the viewpoint of downsizing the signal light transmission member in the optical axis direction.

In a signal light transmission member according to an eighth aspect of the present invention, in any one of the first to seventh aspects, the housing part includes a main body having one end opened, a transparent window (cover glass 15) that closes the one end, and a coupling part (recess 413 and claw 414) that couples the housing part to a housing part of another signal light transmission member. The coupling part is coupled to the housing part of the other signal light transmission member such that the transparent window faces the transparent window of the other signal light transmission member and is parallel or in close contact with the transparent window. The eighth aspect is suitable for constituting a connector for optically coupling optical fibers.

In a signal light transmission member according to a ninth aspect of the present invention, in the eighth aspect, the main body part includes a plurality of recesses (412) arranged in a planar direction as viewed along the optical axis, the lens and the light transmission part are arranged in each of the recesses, and an optical fiber is connected to each of the recesses. The ninth aspect is suitable for constituting a connector that independently connects a plurality of optical fibers.

According to the above aspects, it is possible to achieve an optical communication network in which a loss of signal light is further suppressed, which is expected to be an aid to a highly reliable optical communication system.

EXAMPLES

Hereinafter, as examples of the present invention, connectors for optical communication having a configuration as illustrated in FIG. 1 were manufactured as specific examples of the above-described communication light transmission member. In order to evaluate characteristics of a pair of connectors, two or more connectors were manufactured in each of the following examples and comparative examples.

Example 1

[Preparation of Lens]

A ball lens with a diameter of 2.0 mm, which was subjected to spherical processing with the processing accuracy shown in Table 1, was prepared. The glass material of the ball lens is the glass material RH-21 (n 1530=1.962) manufactured by Nippon Electric Glass Co., Ltd.

TABLE 1

| | |
|---|---|
| Difference between maximum and minimum diameters of ball | ≤1.0 μm |
| Maximum value of radial distance between minimum spherical surface circumscribing surface of ball and each point on ball | ≤1.0 μm |
| Surface roughness (Rmax) | ≤1.0 nm |
| Surface appearance quality | MIL 40-20 |

A barrel-type sputtering apparatus was used to prepare a first layer, a second layer, and a third layer having compositions shown in Table 2 in this order from the base material (lens) side, and an anti-reflective coating as a multilayer coating was formed on the entire surface of the ball lens. In this way, a ball lens having an anti-reflective coating on the entire surface was prepared.

TABLE 2

| | Material | Refractive index | Physical thickness (nm) |
|---|---|---|---|
| Third layer | $SiO_2$ | 1.46 | 85 |
| Second layer | $Al_2O_3$ | 1.63 | 85 |
| First layer | $SiO_2$ | 1.46 | 85 |
| Base material | | 1.96 | — |

[Preparation of Optical Fiber and Cover Glass]

One end of a patch cable of an SC connector of ITU-TG.652 was cut off and processed. Thus, an optical fiber was prepared.

Sapphire glass with a thickness of 1 mm was prepared. Then, a vapor deposition coating forming apparatus was used to produce a first layer, a second layer, and a third layer having compositions shown in Table 3 in this order from the base material (cover glass) side on one principal surface of the sapphire glass, and produce a first layer, a second layer, and a third layer having compositions shown in Table 4 in this order from the base material (cover glass) side on the other principal surface. In this way, a cover glass having a multilayer deposition coating on both surfaces was prepared.

TABLE 3

|  | Material | Refractive index | Physical thickness (nm) |
|---|---|---|---|
| Third layer | $SiO_2$ | 1.46 | 40 |
| Second layer | $ZrO_2$ + $TiO_2$ | 2.10 | 35 |
| First layer | $SiO_2$ | 1.46 | 60 |
| Base material |  | 1.76 | — |

TABLE 4

|  | Material | Refractive index | Physical thickness (nm) |
|---|---|---|---|
| Third layer | $SiO_2$ | 1.46 | 200 |
| Second layer | $ZrO_2$ + $TiO_2$ | 2.10 | 280 |
| First layer | $Al_2O_3$ | 1.63 | 200 |
| Base material |  | 1.76 | — |

[Production of Connector]

In the same manner as the manufacturing method described above with reference to FIGS. 2 to 5, the connector 1 was manufactured by the following procedure.

(1) The ball lens was let stand in the groove portion of an aluminum plate having a cylindrical fixing hole having the same depth and diameter as the diameter of the ball lens.

(2) A thin plate glass for finely adjusting the position of the optical fiber was set under the optical fiber in an orientation perpendicular to the orientation of the middle fiber.

(3) The optical fiber with the protective sleeve for protecting the optical fiber was set in the groove.

(4) The cover glass prepared as described above was bonded to the end edge of the connector that was the front surface such that the multilayer deposited coating of the composition in Table 3 faced the void portion side and the multilayer deposited coating in Table 4 faced forward.

(5) A transparent UV curable resin monomer with a refractive index after curing of 1.46 was slowly charged in a void portion surrounding the ball lens and a groove portion for fixing the optical fiber, while attention was paid so as not to allow air to enter.

(6) The resin, the optical fiber, and the lens were sealed with a glass plate or a resin plate that completely covers the gap portion surrounding the ball lens and the groove portion fixing the optical fiber and transmits UV light.

(7) An optical fiber checker was placed in front of the connector, visible laser light was passed through the optical fiber, the position of the leading end portion of the optical fiber in the void portion was adjusted to be the focal position of the ball lens while the output of the laser light was visually observed, and UV spot light was applied to the protective sleeve portion to fix the protective sleeve.

(8) The position of the optical fiber was adjusted as necessary by finely adjusting in the vertical and horizontal directions the position of the thin plate glass for finely adjusting the position of the optical fiber.

(9) The monomer in the void portion was irradiated with UV light from above the connector through the cover, and the monomer enclosed by the cover in step (6) was polymerized to produce a light transmission part from the UV curable resin.

Example 2

A connector 2 was fabricated in the same manner as in Example 1 except that the composition of an anti-reflective coating at the interface of a ball lens was different. The anti-reflective coating in the connector 2 was produced by the method of specific example 1 in "Method for Manufacturing Lens with Anti-reflective Coating" described above. The anti-reflective coating in the connector 2 was a single-layer coating made of antimony sol, and had a refractive index of 1.49 and a coating thickness of 210 nm. In the connector 2, the anti-reflective coating had an average refractive index of about 1.7, and exhibited sufficient anti-reflection performance as a single layer. This is possibly because the void was impregnated with the monomer, and the void was replaced with the cured resin.

Example 3

[Preparation of Lens]

Sapphire ($Al_2O_3$) ball lens with a diameter of 2.0 mm manufactured by Edmund Optics Inc. was prepared. The processing accuracy of the ball lens used is shown in Table 5.

TABLE 5

| Difference between maximum and minimum diameters of ball | 0.64 μm |
|---|---|
| Maximum value of radial distance between minimum spherical surface circumscribing surface of ball and each point on ball | ≤2.54 μm |

A barrel-type sputtering apparatus was used to prepare a first layer, a second layer, and a third layer having compositions shown in Table 6 in this order from the base material (lens) side, and an anti-reflective coating as a multilayer coating was formed on the entire surface of the ball lens. In this way, a ball lens having an anti-reflective coating on the entire surface was prepared.

TABLE 6

|  | Material | Refractive index | Physical thickness (nm) |
|---|---|---|---|
| Third layer | $SiO_2$ | 1.46 | 40 nm |
| Second layer | $ZrO_2$ + $TiO_2$ | 2.10 | 35 nm |
| First layer | $SiO_2$ | 1.46 | 60 nm |
| Base material |  | 1.77 | — |

A connector 3 was manufactured in the same manner as in Example 1 except that a ball lens with an anti-reflective coating was different. The size of the connector 3 is different from the size of the connector 1 because the focal length of the ball lens is different.

Example 4

A connector 4 was produced in the same manner as in Example 3 except that the composition of an anti-reflective coating at the interface of a ball lens was different. The anti-reflective coating in the connector 4 was produced by the method of specific example 2 in "Method for Manufacturing Lens with Anti-reflective Coating" described above. The anti-reflective coating in the connector 4 is a single-layer coating made of an antimony/silica mixed sol with a refractive index of 1.38 and a coating thickness of 210 nm. In the connector 4, the anti-reflective coating had an average refractive index of about 1.6, similarly to the connector 2, and exhibited sufficient antireflection performance as a single layer.

Comparative Example 1

A connector C1 was produced in the same manner as in Example 1 except that the ball lens prepared in Example 1 was used without producing an anti-reflective coating.

Comparative Example 2

A connector C2 was produced in the same manner as in Example 3 except that the ball lens prepared in Example 3 was used without producing an anti-reflective coating.

Comparative Example 3

A connector C3 was produced in the same manner as in Example 1 except that the ball lens prepared in Example 1 was used without producing an anti-reflective coating and the void portion was not filled with a monomer.

Comparative Example 4

A connector C4 was produced in the same manner as in Example 3 except that the ball lens prepared in Example 3 was used without producing an anti-reflective coating and the void portion was not filled with a monomer.
[Evaluation]

The pairs of connectors 1 to 4 and C1 to C4 produced in Examples 1 to 4 and Comparative Examples 1 to 4 were each fixed to a precision stage with the reference surface facing downward, and cover glasses were disposed facing each other at a distance of 1 mm. One of the connectors was defined as a light emitting side, and the other optical connector was defined as a light receiving side. The connector on the light emitting side was connected to an OTDR AQ 7275 manufactured by Yokogawa Test & Measurement Corp. The connector on the light receiving side was connected to the optical power meter PPM-352C manufactured by EXFO Inc. An optical signal was output from the OTDR on the light emitting side in a 1310-nm emission mode, the precision stage was moved while the intensity of the optical signal displayed on the power meter on the light receiving side was read, and the numerical value of the greatest intensity of the optical signal was examined. Table 7 shows measurement results.

TABLE 7

| | Optical signal intensity | |
|---|---|---|
| | dBm | μW |
| Example 1 | −3.162 | 487.7 |
| Example 2 | −3.119 | 482.8 |
| Example 3 | −3.250 | 473.2 |
| Example 4 | −3.206 | 478.0 |
| Comparative example 1 | −3.468 | 450.0 |
| Comparative example 2 | −3.512 | 445.5 |
| Comparative example 3 | −3.773 | 419.4 |
| Comparative example 4 | −3.817 | 415.2 |

From the results in Table 7, it can be seen that all the connectors 1 to 4 in Examples 1 to 4 have higher optical signal intensities and lower signal light losses inside the connectors than the connectors C1 to C4 in Comparative Examples 1 to 4. From the above, it is clear that transmission of an optical signal by an expanded beam connector according to the present invention can be performed with a lower loss as compared with conventional expanded beam connectors.

What is claimed is:

1. A signal light transmission member comprising:
   a lens that has a refractive index n1 and is configured to collimate signal light;
   a housing part that houses the lens;
   a light transmission part that has light permeability, has a refractive index n2 smaller than n1, is made of a light transmission material filling the housing part, and has the lens embedded therein;
   an optical fiber through which the signal light passes, the optical fiber being inserted into the housing part and having an end portion fixed by the light transmission part at a position facing the lens on an optical axis of the lens in the housing part; and
   an anti-reflective coating that is formed at least at a portion of the optical path of the signal light at the interface between the lens and the light transmission part, wherein
   if the refractive index of a core material of the optical fiber is designated as n4, a following equation (1) is satisfied:

$$n4-0.14 \leq n2 \leq n4+0.14 \qquad (1).$$

2. The signal light transmission member according to claim 1, wherein a following equation (2) is satisfied:

$$n1-n2 \geq 0.19 \qquad (2).$$

3. The signal light transmission member according to claim 1, wherein the anti-reflective coating is a single-layer coating made of at least inorganic fine particles.

4. The signal light transmission member according to claim 3, wherein if an average refractive index of the anti-reflective coating is designated as n3, a following equation (3) below is satisfied:

[Mathematical Equation 1]

$$\sqrt{(n1 \times n2)} - 0.02 \leq n3 \leq \sqrt{(n1 \times n2)} + 0.02 \qquad (3).$$

5. The signal light transmission member according to claim 3, wherein
   the anti-reflective coating includes:
   antimony particles or mixed particles of antimony particles and silica particles;
   a binder component curing agent that binds the antimony particles or the mixed particles; and
   a light transmission material that fills gaps between the antimony particles or the mixed particles and the binder component curing agent.

6. The signal light transmission member according to claim 3, wherein the anti-reflective coating made of the single-layer coating is formed on an entire surface of the interface.

7. The signal light transmission member according to claim 1, wherein the lens is a ball lens.

8. The signal light transmission member according to claim 1, wherein
   the housing part includes a main body having one end opened, a transparent window that closes the one end, and a coupling part that couples the housing part to a housing part of another signal light transmission member, and
   the coupling part is coupled to the housing part of the other signal light transmission member such that the transparent window faces the transparent window of the other signal light transmission member and is parallel or in close contact with the transparent window.

9. The signal light transmission member according to claim 8, wherein the main body part includes a plurality of recesses arranged in a planar direction as viewed along the optical axis, the lens and the light transmission part are arranged in each of the recesses, and an optical fiber is connected in each of the recesses.

\* \* \* \* \*